UNITED STATES PATENT OFFICE.

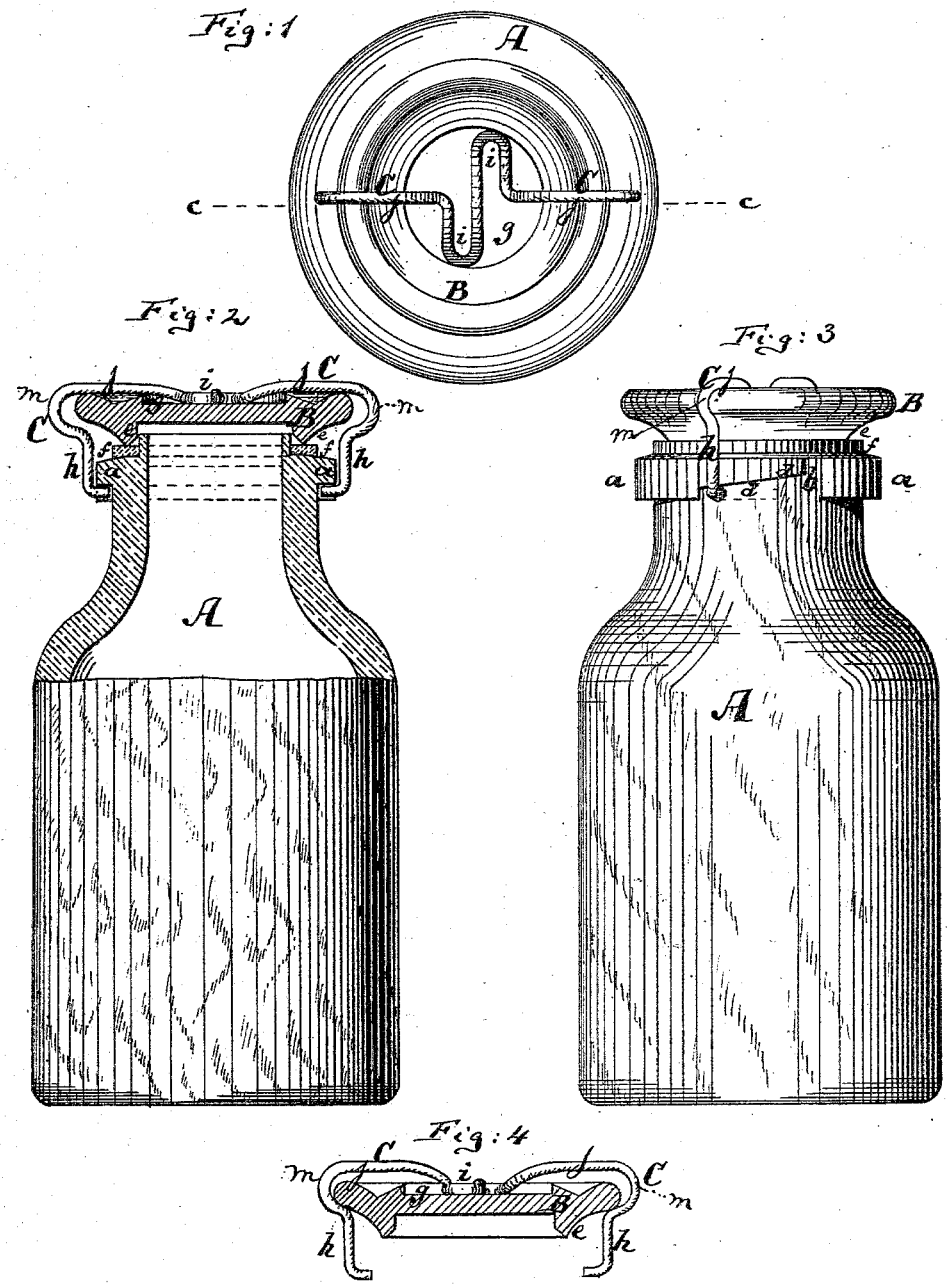

GEORGE W. GOMBER, OF SYBERTSVILLE, PENNSYLVANIA, ASSIGNOR TO HENRY W. PUTNAM, OF BENNINGTON, VERMONT.

FRUIT-JAR.

SPECIFICATION forming part of Letters Patent No. 295,244, dated March 18, 1884.

Application filed December 31, 1883. (No model.)

*To all whom it may concern:*

Be it known that I, GEORGE W. GOMBER, a resident of Sybertsville, in the county of Luzerne and State of Pennsylvania, have invented an Improvement in Fruit-Jars, of which the following is a full, clear, and exact description, reference being made to the accompanying drawings, in which—

Figure 1 is a top view of a fruit-jar containing my improvement. Fig. 2 is a sectional side view of the same, the line $c\ c$, Fig. 1, indicating the plane of section. Fig. 3 is a side view of the same. Fig. 4 is a vertical central section of the cover, taken on the same plane as Fig. 2, but showing the cover detached from the jar itself. Fig. 5 is a similar section of the cover, taken at right angles to the plane of the line $c\ c$, Fig. 1.

The object of this invention is to provide fruit-jars with means for readily and effectually closing down the lids upon them, and for as readily and effectually opening them whenever required.

The invention consists, principally, in the employment of a peculiar detachable spring-holder, by which the lid is held down, and which spring-holder has a central springing enlargement that serves to hold it in place on the lid.

In the drawings, the letter A represents a fruit-jar of suitable construction, having at its upper part a projecting collar, $a$, in which collar there are, on diametrically-opposite sides, vertical slots $b$, for admitting the fastening devices, and which collar, moreover, has inclined faces $d$ adjoining these slots, as indicated in Fig. 3.

B is the lid of the fruit-jar, which may either have a downwardly-extending lip, $e$, resting on a rubber ring or other packing, $f$, that bears upon the collar, or which may, if desired, rest directly upon the upper end of the jar, a suitable packing-ring being interposed between it and the jar. The top of this lid has a circular depression, $g$, so as to retain it in the central enlargement of the holder C. The holder C may be made out of one single piece of wire in such a way that its ends form downwardly-projecting hooks $h$, that are adapted to hook under the collar $a$ of the fruit-jar. The middle portion of the holder C has laterally-projecting wings $i\ i$, which constitute the central enlargement of the holder. These wings, or this enlargement, when placed upon the lid B or cover, will fit into the depression $g$, so as to spring against the walls thereof, as is more clearly indicated in Fig. 5 of the drawings. The holder C is thus sprung into and practically held in the depression $g$, and the holder is swiveled to the lid B and readily removable therefrom. The parts $j$ of the holder which intervene between the wings $i$ and the hooks $h$ constitute springs for the hooks, and are so formed that when the lid B is taken off the jar they will spring with their curved outer parts, $m$, away from the top of said lid and against the under side thereof, as shown in Fig. 4, thereby holding the fastener in place on the lid; but when the lid is put on the jar and the hooks are made to ride down along the inclines $d$, as in Fig. 3, these spring parts $j$ will be drawn tightly upon the top of the lid, as is also shown in Fig. 2. Thus the lid is held by spring action to its place.

In applying the lid the hooks $h$ are brought in line with the slots $b$, and then, after they have passed through said slots, the holder C is turned without turning the lid B until the hooks have traveled along the inclines $d$ sufficiently far to tightly draw the lid against the packing.

I have stated that the holder C may be made of one piece of wire, and as such it is represented. The advantage of thus constructing it is economy in manufacture and an attainment of the spring action required for holding it in place on the lid, and also for drawing the hooks tightly in the manner stated.

It will be seen that whenever the lid is taken off the jar the fastener remains—is retained by the springing wings $i\ i$—on the lid in its proper place, and is always ready to be applied again to the jar.

I claim—

1. The jar-fastener C, made with central springing enlargement, with spring arms $j$, having curved portions $m$, and downwardly-extending hooks $h\ h$, substantially as described.

2. The combination of the lid B, having depression $g$, with the holder C, swiveled by spring enlargements $i\ i$ in said depression, said holder having spring-arms $j$, with curved portions $m$, and hooks $h$, substantially as and for the purpose herein shown and described.

GEO. W. GOMBER.

Witnesses:
N. D. SMITH,
SOLOMON KECK.